C. L. BASTIAN.
DRAFT ARM AND OTHER VALVE.
APPLICATION FILED NOV. 23, 1908.
952,178.
Patented Mar. 15, 1910.
2 SHEETS—SHEET 2.
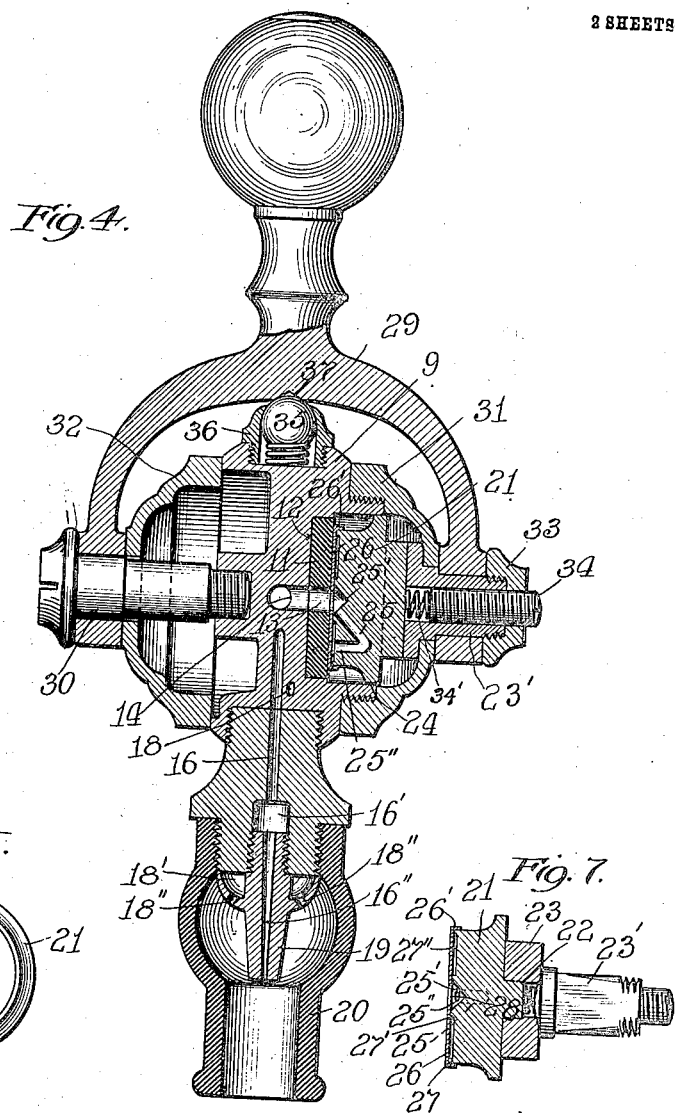
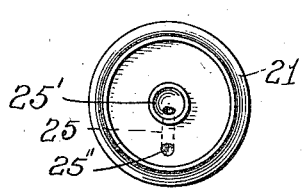
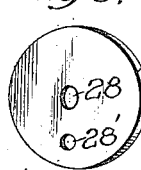
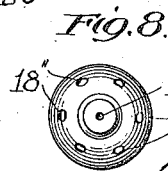
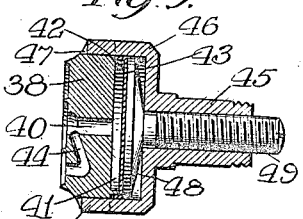
Witnesses
Harry R. Lewhite
M. A. Kiddie
Inventor
Charles L. Bastian
By Wm. T. Bel Atty.

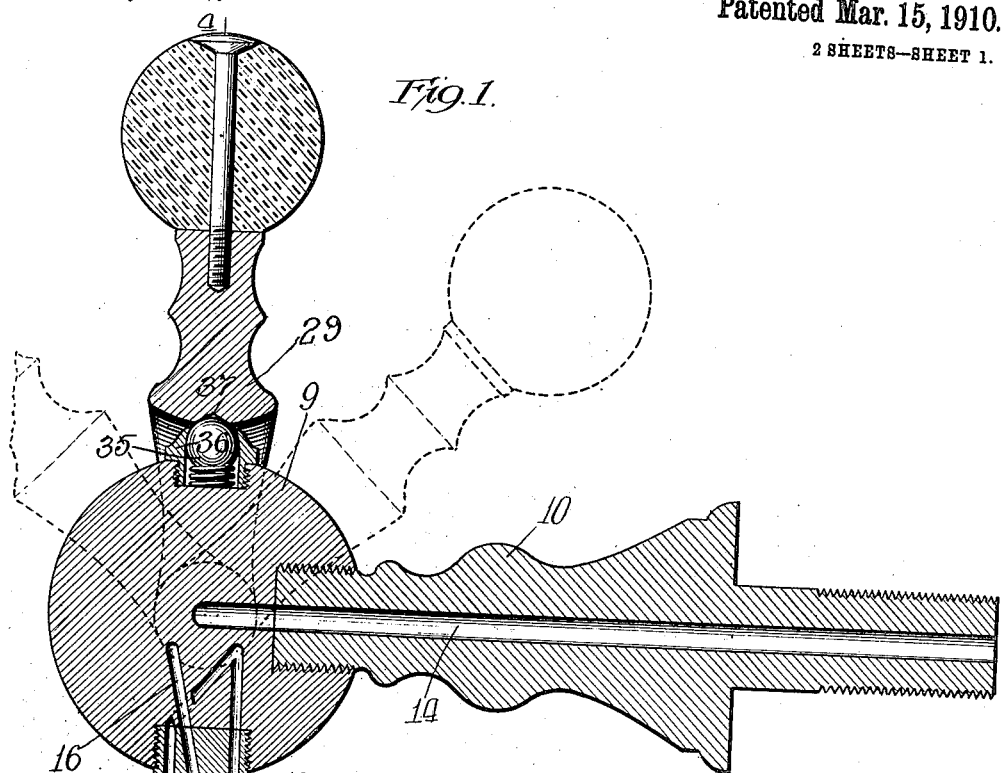

UNITED STATES PATENT OFFICE.

CHARLES L. BASTIAN, OF CHICAGO, ILLINOIS.

DRAFT-ARM AND OTHER VALVE.

952,178.

Specification of Letters Patent. Patented Mar. 15, 1910.

Application filed November 23, 1908. Serial No. 464,108.

*To all whom it may concern:*

Be it known that I, CHARLES L. BASTIAN, a citizen of the United States, residing at Chicago, county of Cook, and State of Illinois, have invented new and useful Improvements in Draft-Arms and other Valves, of which the following is a specification.

This invention relates to improvements in valves and while it is designed more especially for a soda fountain draft arm it is also adaptable to other valves for use in connection with fluids under pressure.

The object of the invention is, primarily, to utilize the pressure of the fluid for tightly sealing the valve to prevent leakage.

A further object of the invention is to provide means for centering the operating handle of a draft arm valve in closed position.

The invention has other objects in view which will be fully pointed out in the detail description hereinafter.

In the accompanying drawings I have illustrated the invention as embodied in a soda fountain draft arm and referring thereto—

Figure 1 is a sectional view through the center of the draft arm taken longitudinally of the inlet shank. Fig. 2 is a detail view showing the seat for the disk in the valve head. Fig. 3 is a detail view of the valve disk. Fig. 4 is a sectional view on the line 4—4 of Fig. 1. Fig. 5 is a detail view of the tumbler with the diaphragm removed. Fig. 6 is a perspective view of the tumbler diaphragm. Fig. 7 is a detail sectional view of the tumbler and its shank. Fig. 8 is a bottom plan view of the inner nozzle. Fig. 9 is a detail sectional view of the tumbler and shank showing another embodiment of the invention.

Referring to the drawings, 9 is the head of the draft arm and it is provided with a shank 10 for connection with the fountain. A valve disk 11 (Fig. 3) is arranged in a seat 12 (Fig. 2) in one side of the head, and this disk is provided with a port 13 which registers with one end of an angular passage 14 extending through the head and its shank and through which the carbonated liquid flows from the fountain to the valve. The valve disk also has a port 15 which registers with a fine stream passage 16 extending through the head and communicating with a chamber 16'. Another port 17 in the disk registers with the upper connected ends of a plurality of coarse stream passages 18 extending through the head and discharging into a chamber 18' formed in the inner nozzle 19. This nozzle 19 is screwed into the head and is provided with a passage 16" which communicates with the chamber 16' and discharges a fine stream, and is also provided with ports 18" communicating with the chamber 18' and discharging into the outer nozzle 20 fastened to the head. The inner nozzle discharges a fine stream through the outer nozzle and the outer nozzle discharges a coarse stream, it being understood that these streams are discharged at different times according to the position in which the valve is adjusted to open communication between the passage 14 and the passage 16 or the passages 18.

A tumbler 21 (Figs. 5, 7) has a tongue and groove connection at 22 with its shank 23. The tumbler is arranged opposite the disk 11 and is guided at 24 in the head which is shaped to receive the tumbler. An angular passage 25 in the tumbler (Fig. 4) has its inlet 25' centrally disposed to register with the port 13 in the valve disk and its outlet 25" arranged to register with the port 15 or the port 17. A yielding diaphragm 26 (Fig. 6) is arranged between the disk and the tumbler and it is preferably provided with a peripheral flange 26' whereby it can be fitted on the inner end of the tumbler, as shown in Fig. 7, to turn therewith. The tumbler has a peripheral rib 27 and another rib 27' between the inlet and outlet of the passage 25, which ribs are engaged by the diaphragm when the latter is in place on the tumbler. Thus a pressure chamber 27" is formed between the tumbler and the diaphragm and this chamber is in communication with the outlet 25" of the passage 25 and will be filled with the liquid to press the diaphragm tightly against the disk and effectively seal the valve to prevent leakage. The diaphragm has openings 28 and 28' in registration with the inlet 25' and the outlet 25", respectively, of the passage 25 in the tumbler. The full pressure of the liquid is thus employed to prevent leakage by pressing the diaphragm tightly against the disk and at the same time the face of the disk is protected from the direct contact of the liquid therewith. If it were not for the diaphragm the liquid would in time force its way out from outlet 25" between the tumbler and disk, wearing the disk and causing the valve to leak. The pressure chamber 27″ formed in the face of the tumbler beneath the diaphragm is extensive in area but shallow in depth so that the fluid pressure will be exerted over a large part of the diaphragm which provides a sealing device of large area to engage the disk. The shallow pressure chamber reduces the quantity of fluid in the draft arm where it may become warm when the draft arm is used infrequently. As the diaphragm is more or less yielding it will readily adjust itself to the face of the disk under pressure and effectually prevent leakage.

A bifurcated handle 29 is engaged with a circular bolt 30, which is screwed into the head, and with the squared portion 23′ of the shank 23. Cheek plates 31 and 32 are arranged on the shank 23 and the bolt 30, respectively, between the handle and the head, and the cheek plate 31 is preferably screwed on to the head. A nut 33 is screwed on to the end of the shank 23 to secure the handle in place thereon. The shank 23 and the nut 33 are bored and threaded to receive an adjusting screw 34 which may directly engage the tumbler to adjust it to the disk, but I prefer to interpose a spring 34′ between the tumbler and the inner end of said adjusting screw.

A spring-pressed ball 35 is secured within a casing 36 on the head at the top thereof to engage a socket 37 in the handle and form a yielding stop whereby to center the handle in position to close the valve with the outlet 25″ of the passage 25 out of register with the ports 15 and 17.

The tumbler, diaphragm, and the parts coöperating therewith within the case to shut off the fluid supply, constitute the valve which is normally closed with the outlet 25″ of the passage 25 located between the ports 15 and 17 when the handle is in upright position, as shown in full lines in Fig. 1, and the ball 35 is in engagement with the socket 37. When the handle is pulled forward, to the left in Fig. 1, it will turn the shank 23, by reason of the squared engagement therewith, and the tumbler 21 to register the outlet 25″ with the port 17 to discharge a coarse stream, and when the handle is pushed backward (to the right in Fig. 1) the outlet 25″ will be registered with the port 15 to discharge a fine stream. When the handle is adjusted to central position to close the valve the full liquid pressure will be exerted on the diaphragm to press the diaphragm tightly against the disk to seal the valve. This prevents leakage and consequent dripping from the draft arm while the valve is closed. The yielding stop provides a sufficient check on the operator in adjusting the handle to indicate to him when the handle is centered in position to close the valve, and this guards against the operator leaving the valve in a position where more or less leakage would result.

In Fig. 9 I have shown another embodiment of the invention in which the tumbler 38 seats directly against the disk and has a passage 40 communicating with a pressure chamber 41 which is inclosed by a rib 42 on the outer side of the tumbler. A diaphragm 43 is fitted on the rib 42 and a passage 44 leads from the passage 40 within the tumbler to register with the discharge passages in the disk as before described. The shank 45 has a hollow cap 46 to receive the diaphragm and projections 46′ to engage sockets 47 in the tumbler to lock the shank and tumbler together. A follower 48 is arranged within the cap 46 to engage the diaphragm and the adjusting screw 49 engages the follower. When the valve is closed the full pressure of the fluid will be exerted in the chamber 41 against the diaphragm, which is solidly backed by the follower 48, and against the tumbler, and the latter will be forced tightly against the disk by said pressure to prevent leakage as heretofore described in connection with the construction of Figs. 1–8. When the valve is opened by turning the tumbler the liquid will flow through the passage 40 into passage 44 and thence to the discharge passages as before described.

In the construction of Figs. 1–8 the diaphragm is located between the tumbler and the disk, but this location may be changed, as indicated for example in Fig. 9 which shows the diaphragm behind the tumbler. In each construction, however, the diaphragm is arranged to provide a pressure chamber located so that the pressure of the fluid will be exerted to tightly seal the valve and prevent leakage while the valve is open or closed, thereby greatly reducing wear on the valve disk. When the valve is closed the full pressure of the fluid is exerted upon the valve, but when the valve is open this pressure will, of course, be reduced.

What I claim and desire to secure by Letters Patent is:

1. The combination of a head having fluid inlet and discharge passages therein, a disk and a tumbler interposed between said inlet and discharge passages, a shallow pressure chamber of large area in constant communication with the inlet passage through a communication in the tumbler, said chamber being formed by the tumbler and a diaphragm, the fluid under pressure in said chamber acting upon the diaphragm to seal the discharge passages.

2. The combination of a head having fluid inlet and discharge passages therein, a valve comprising a disk and a tumbler, means for longitudinally adjusting the position of said tumbler, a diaphragm, and an inclosed pressure chamber in constant communication with the inlet passage, said chamber being formed by said tumbler and diaphragm, pressure in said chamber acting against its walls to seal the discharge passages.

3. The combination of a head having fluid inlet and discharge passages therein, a valve between said passages and comprising a rotatably movable tumbler, a yielding diaphragm, and an inclosed pressure chamber between the tumbler and diaphragm in which the fluid under pressure acts upon the tumbler and diaphragm to seal the outlet passages.

4. The combination of a head having inlet and discharge passages therein, a valve between said passages and comprising a rotatably movable tumbler, a yielding diaphragm alongside of said tumbler, and an inclosed pressure chamber between the tumbler and diaphragm in which the fluid under pressure acts upon the tumbler and diaphragm to seal the outlet passages.

5. The combination of a head having inlet and discharge passages therein, a valve between said passages comprising a tumbler, a yielding diaphragm fitted on said tumbler to move therewith, and an inclosed pressure chamber in the tumbler beneath the diaphragm in which the fluid under pressure acts upon the tumbler and diaphragm to seal the outlet passages.

6. The combination of a head having inlet and discharge passages therein, a valve between said passages and comprising a tumbler, a rib at one side of said tumbler, a diaphragm fitted on the tumbler against said rib, and a pressure chamber inclosed by the tumbler and its rib and the diaphragm in which the fluid under pressure acts upon the tumbler and diaphragm to seal the outlet passages.

7. The combination of a head having inlet and discharge passages therein, a valve between said passages and comprising a tumbler having an angular passage therein, a rib on one side of said tumbler around the inlet to said angular passage and another rib on the tumbler inclosing the outlet of said angular passage, a diaphragm on the tumbler against said ribs and fitted to turn with the tumbler, and a pressure chamber in the side of the tumbler between said ribs and inclosed by the diaphragm in which the fluid under pressure acts upon the tumbler and diaphragm to seal the outlet passages.

8. The combination of a head having inlet and discharge passages therein, a disk seated in said head, a valve between said passages comprising a tumbler, a diaphragm between the tumbler and disk, and an inclosed pressure chamber between the diaphragm and tumbler and connected to the inlet passage through the tumbler in which the fluid under pressure acts upon the diaphragm to seal the same against the disk.

9. The combination of a head having inlet and discharge passages therein, a disk seated in the head, a valve between said passages comprising a longitudinally adjustable tumbler having an angular passage therein, a diaphragm between the disk and tumbler and provided with openings to register with the inlet and outlet of said angular passage, and a pressure chamber between the diaphragm and tumbler and in communication with the outlet of said angular passage in which the fluid under pressure acts upon the diaphragm to seal the same against the disk.

10. The combination of a head having inlet and discharge passages therein, a valve interposed between said inlet and discharge passages comprising a disk, a diaphragm and a tumbler, all in communication with the inlet passage, and an inclosed pressure chamber formed by and between said tumbler and diaphragm, adapted under the pressure of the contained fluid to seal the outlet passages.

11. The combination of a head having inlet and discharge passages therein, a disk, a diaphragm, and a tumbler, means whereby the position of the diaphragm and tumbler may be longitudinally adjusted, an inclosed pressure chamber, and a communication between said pressure chamber and said inlet passage through said tumbler.

CHARLES L. BASTIAN.

Witnesses:
L. G. BLESSING,
HJALMAR MATHISON.